(12) United States Patent
Wang et al.

(10) Patent No.: US 8,381,210 B2
(45) Date of Patent: Feb. 19, 2013

(54) METHOD AND COMPUTER FOR SYNCHRONOUS SCHEDULING OF MULTIPLE VIRTUAL CPUS

(75) Inventors: Kai Wang, Beijing (CN); Chunmei Liu, Beijing (CN)

(73) Assignees: Lenovo (Beijing) Limited (CN); Beijing Lenovo Software Ltd (CN)

( * ) Notice: Subject to any disclaimer, the term of this patent is extended or adjusted under 35 U.S.C. 154(b) by 1052 days.

(21) Appl. No.: 12/317,483

(22) Filed: Dec. 23, 2008

(65) Prior Publication Data

US 2009/0183153 A1 Jul. 16, 2009

(30) Foreign Application Priority Data

Dec. 24, 2007 (CN) .......................... 2007 1 0304034

(51) Int. Cl.
*G06F 9/455* (2006.01)
*G06F 9/46* (2006.01)
(52) U.S. Cl. .......................................................... 718/1
(58) Field of Classification Search .................. None
See application file for complete search history.

(56) References Cited

U.S. PATENT DOCUMENTS 6,961,941 B1 * 11/2005 Nelson et al. ................. 719/319

OTHER PUBLICATIONS

Uhlig et al.; Towards Scalable Multiprocessor Virtual Machines; 2004.*
Govil et al.; Cellular Disco: Resource Management Using Virtual Clusters on Shared-Memory Multiprocessors; 2000.*

* cited by examiner

*Primary Examiner* — Corey S Faherty
(74) *Attorney, Agent, or Firm* — Schwegman Lundberg & Woessner, P.A.

(57) ABSTRACT

According to the present invention, a method and computer for synchronous scheduling of multiple virtual CPU is provided, which comprises: a guest operation system, comprising a first virtual CPU and a second virtual CPU; a first physical CPU and a second physical CPU; a virtual machine monitor, comprising: synchronous notifying module, for notifying, in a synchronous manner, the second physical CPU corresponding to the second virtual CPU after the second virtual CPU is determined to be synchronously operated with the first virtual CPU scheduled to the first physical CPU; and synchronous scheduling module, for scheduling the second virtual CPU out of the scheduling queue; wherein the second virtual CPU is operated on the second physical CPU. According the above technical solution, the synchronous scheduling of the multiple virtual CPUs belonging to the synchronous GOS can be achieved. The timeout problem in the prior art due to the unsynchronized operation of multiple VCPUs can thus be effectively solved, and the execution performance of the concurrent programs can be improved.

13 Claims, 5 Drawing Sheets

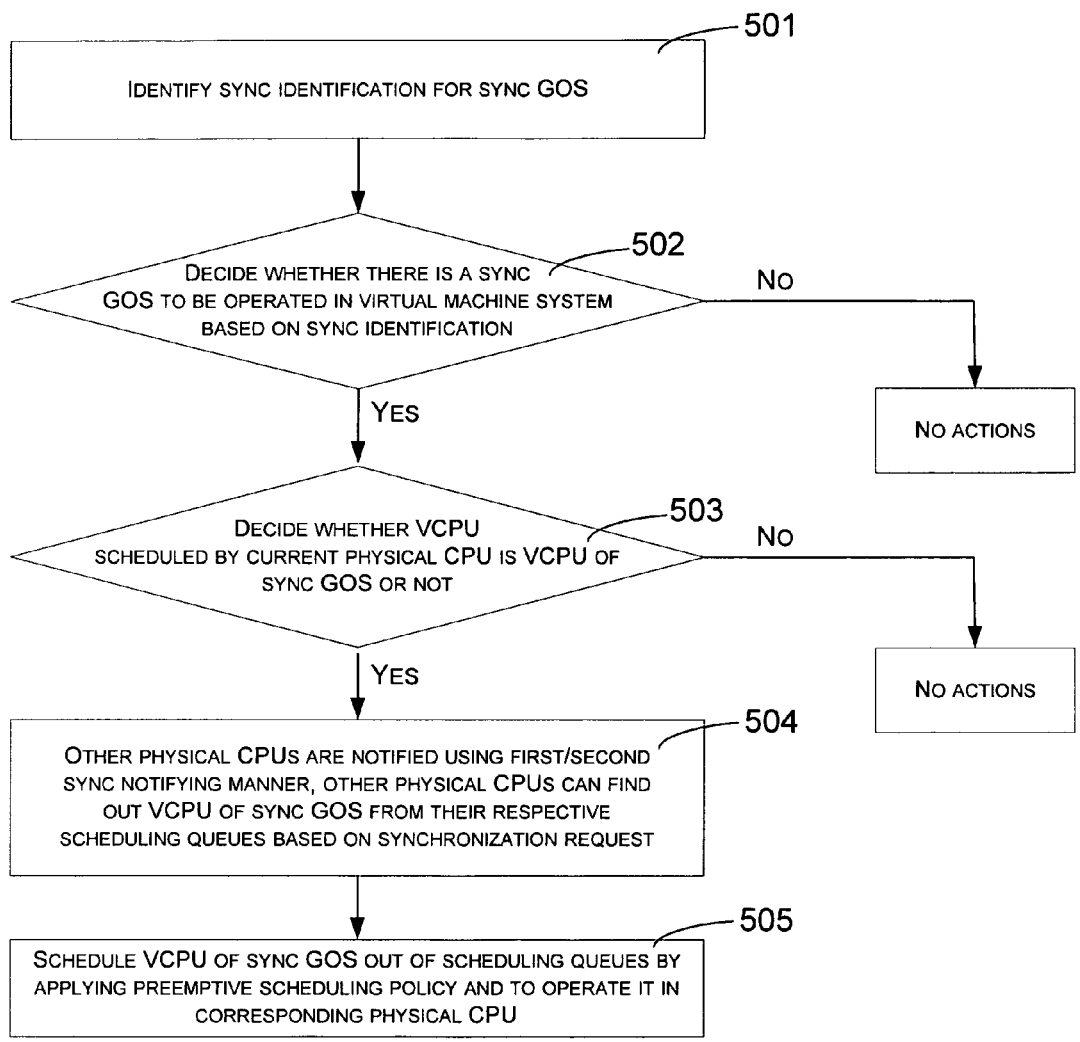

METHOD AND COMPUTER FOR SYNCHRONOUS SCHEDULING OF MULTIPLE VIRTUAL CPUS

RELATED APPLICATIONS

This application claims the benefit of priority, under 35 U.S.C. Section 119, to Chinese Patent Application Serial No. 200710304034.X, filed on Dec. 24, 2007, which is incorporated herein by reference in its entirety.

BACKGROUND OF THE INVENTION

1. Field of Invention

The present invention relates generally to virtual machine technology, particularly to a method and computer for synchronous scheduling of multiple virtual CPUs (VCPUs).

2. Description of Prior Art

For most of Guest Operation Systems (GOSs), several VCPUs belonging to the same GOS do not operate synchronously in the existing virtual machine environment. Although most of operation systems and applications have little concern with whether each one of the multiple core CPUs is available simultaneously, the unsynchronized operations of several VCPUs belonging to the same GOS will lead to the following problem.

The first problem is timeout. During the operation of a GOS, Virtual Machine Monitor (VMM) transmits the clock interrupts only to the Virtual Bootstrap Processor (VBSP) of the GOS. If the scheduling of the Virtual Application Processor (VAP) in the GOS and of the VBSP in the GOS is not synchronized, the timeout problem of the timer in VAP is inevitable for the following reason. When scheduling the VAP in the GOS, which is responsible for the execution and application of the program, the VBSP in the GOS, which is responsible for the initialization of the system, has already received several interrupts transmitted by the VMM. The system time of the entire GOS has been advanced by these interrupts for a long period. Therefore, compared with the operation time of the VAP, the system time of the entire GOS has been skipped for a long period when the VAP starts up. Consequently, several timers among the time queue in the VAP are timeout. The timeout problem tends to arise particularly in the case of clock interrupt compensation mechanism.

A further problem is the performance of the concurrent execution of programs. For concurrent programs, not only the concurrent execution among multiple threads or processes, but also the synchronization with one another is required. For example, when a first thread has to wait for the result of the execution of a second thread for proceeding, it is desired that the second thread obtains its results as soon as possible. However, a plurality of threads can be executed on a plurality of different CPUs to achieve concurrent execution. If there is such a case on multiple unsynchronized VCPUs, it is likely that the untimely operation of the threads or processes on one CPU will result in the failure of threads or processes on others. It will significantly degrade the execution performance of the concurrent programs.

SUMMARY OF THE INVENTION

In view of this, the object of the embodiments of the present invention is to provide a method and computer for synchronous scheduling of multiple virtual CPUs, by which the synchronous scheduling of multiple virtual CPUs of the synchronous GOS can be achieved.

In one aspect, a method for synchronous scheduling of multiple virtual CPUs is provided, which comprises:

determining a second virtual CPU to be synchronously operated with a first virtual CPU scheduled into a first physical CPU;

notifying, in a synchronous manner, a second physical CPU which corresponds to the second virtual CPU and has a scheduling queue in which the second virtual CPU is contained;

searching, by the second physical CPU, the second virtual CPU from the scheduling queue;

scheduling the second virtual CPU out of the scheduling queue, and operating it on the second physical CPU.

According the above method, the step of notifying comprises:

transmitting a synchronization request to the second physical CPU; or transmitting a synchronization request to the first physical CPU, the synchronization request being forwarded to the second physical CPU by the first physical CPU in a predetermined way.

According to the above method, the predetermined way is inter-processor interrupt manner.

According to the above method, the first virtual CPU and the second virtual CPU both belong to the same guest operation system, which is a synchronous guest operation system.

According to the above method, the step of determining comprises:

identifying a synchronous identification for the synchronous guest operation system;

determining the guest operation system which is operating as the synchronous guest operation system based on the synchronous identification.

The method comprises:

arranging the positions of the multiple virtual CPUs in the scheduling queues of the corresponding multiple physical CPUs based on the operation states of the multiple virtual CPUs belonging to the synchronous guest operation system.

In another aspect, a computer is provided, which comprises:

a guest operation system, comprising a first virtual CPU and a second virtual CPU;

a first physical CPU and a second physical CPU, the first physical CPU having a first scheduling queue and the second physical CPU having a second scheduling queue, wherein the first virtual CPU corresponds to the first scheduling queue and the second virtual CPU corresponds to the second scheduling queue;

a virtual machine monitor, comprising:
  synchronous notifying module, for notifying, in a synchronous manner, the second physical CPU corresponding to the second virtual CPU after the second virtual CPU is determined to be synchronously operated with the first virtual CPU scheduled into the first physical CPU;
  synchronous scheduling module, for scheduling the second virtual CPU out of the scheduling queue;

wherein the second virtual CPU is operated on the second physical CPU.

According to the above computer, the synchronous notifying module comprises:

a first synchronous notifying unit, for transmitting synchronization request to the second physical CPU;

a second synchronous notifying unit, for transmitting a synchronization request to the first physical CPU, the synchronization request being forwarded to the second physical CPU by the first physical CPU in a predetermined way.

According to the above computer, the predetermined way is inter-processor interrupt manner.

According to the above computer, the first virtual CPU and the second virtual CPU both belong to the same guest operation system, which is a synchronous guest operation system.

The computer comprises:
a synchronous identifying module, for identifying a synchronous identification for the synchronous guest operation system;
a synchronous deciding module, for deciding the guest operation system which is operating as the synchronous guest operation system based on the synchronous identification.

The computer comprises:
an environment adjusting module, for arranging the positions of the multiple virtual CPUs in the scheduling queues of the corresponding multiple physical CPUs based on the operation states of the multiple virtual CPUs belonging to the synchronous guest operation system.

The method and computer for synchronous scheduling of multiple virtual CPUs according to the embodiments of the present invention properly arrange the positions of the multiple virtual CPUs in the scheduling queues of the multiple physical CPUs based on the operation states of the multiple virtual CPUs. When it is determined that the current virtual CPU scheduled by the current physical CPU is required to be synchronized with the operation of anther virtual CPU, a synchronization request is transmitted to other multiple physical CPUs, so that other multiple physical CPUs can search the multiple VCPUs belonging to the synchronous GOS located in their scheduling queues, respectively. The VCPU of the synchronous GOS is scheduled out of the scheduling queues by applying the preemptive scheduling policy and then operated on the corresponding physical CPU. Therefore, synchronous scheduling of the operation of multiple VCPUs belonging to the synchronous GOS can be achieved. The timeout problem in the prior art due to the unsynchronized operation of multiple VCPUs can thus be effectively solved, and the execution performance of the concurrent programs can be improved.

BRIEF DESCRIPTION OF THE DRAWINGS

FIG. 5 is a flow chart of the method for synchronous scheduling of multiple VCPUs according to the second embodiment of the present invention.

DETAILED DESCRIPTION OF PREFERRED EMBODIMENTS

In the following, the particular embodiments of the present invention will be described with reference to the drawings.

The VMM identifies a synchronous identification for the GOS in which the synchronization of multiple VCPUs is required. After determining, based on the synchronous identification, that there is a synchronous GOS to be operated in the virtual machine environment, the positions of the multiple virtual CPUs are arranged properly in the scheduling queues of the multiple physical CPUs based on the operation states of the multiple virtual CPUs of the synchronous GOS. After determining the VCPU scheduled by the current physical CPU as the VCPU of the synchronous GOS, a synchronization request is transmitted to other physical CPUs than the current one, so that other physical CPUs can find out the VCPU of the synchronous GOS from their respective scheduling queues of VCPUs. The VCPU of the synchronous GOS can be scheduled out of the scheduling queues by a preemptive scheduling policy and operated on the corresponding physical CPU.

In the virtual machine environment, according to the current number of the physical CPUs and the configuration information in the configuration file of the virtual machine, the VMM provides each GOS a corresponding number of VCPUs. In general, the number of VCPUs is less than or equal to the number of physical CPUs, since the synchronous operation of multiple VCPUs on multiple physical CPUs corresponding to the multiple VCPUs can not be achieved by the virtual machine system if the number of VCPUs exceeds the number of physical CPUs.

Figure 1:
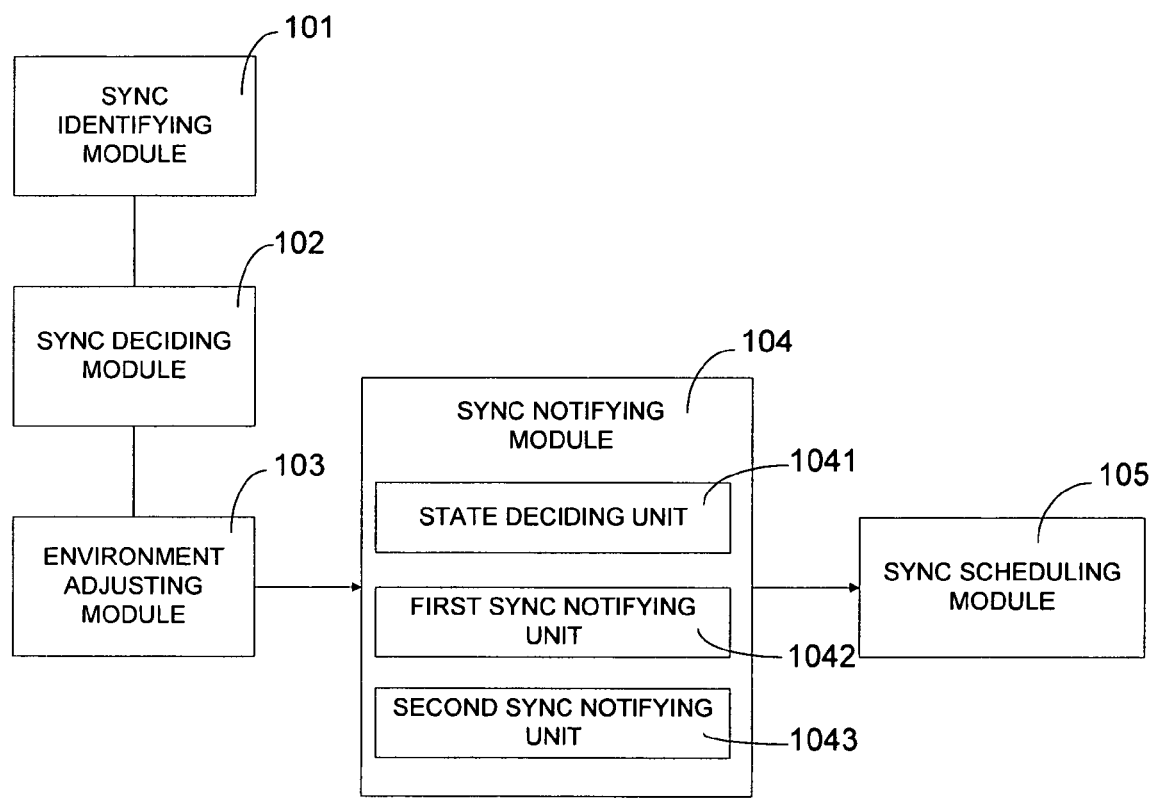
FIG. 1 is a block diagram of the structure of the means for synchronous scheduling of multiple VCPUs according to the first embodiment of the present invention.

FIG. 1 is a block diagram of the structure of the means for synchronous scheduling of multiple VCPUs according to the first embodiment of the present invention. In FIG. 1, there are a synchronous identifying module 101, a synchronous deciding module 102, an environment adjusting module 103, a synchronous notifying module 104 and a synchronous scheduling module 105.

The synchronous identifying module 101 is used to identify a synchronous identification for the synchronous GOS, wherein the synchronous GOS is the GOS comprising multiple VCPUs whose operation needs synchronous scheduling.

The synchronous deciding module 102 is used to decide whether there is a synchronous GOS to be operated in the virtual machine system based on the synchronous identification.

The environment adjusting module 103 is used to arrange the positions of the multiple virtual CPUs in the scheduling queues of the multiple physical CPUs based on the operation states of the multiple virtual CPUs belonging to the synchronous GOS.

Each one of the multiple physical CPUs contains a scheduling queue. There is a one-to-one correspondence between the multiple VCPUs of the synchronous GOS and the multiple physical CPUs. For example, the multiple physical CPUs comprise a first physical CPU and a second physical CPU, and the multiple VCPUs of the synchronous GOS comprise a first VCPU and a second VCPU. The first physical CPU contains a first scheduling queue, and the second physical CPU contains a second scheduling queue. Arranging the positions of the multiple virtual CPUs of the synchronous GOS in the scheduling queues of the multiple physical CPUs based on the operation states of the multiple virtual CPUs belonging to the synchronous GOS further comprises: arranging the first VCPU into the first scheduling queue of the first physical CPU, and arranging the second VCPU into the second scheduling queue of the second physical CPU.

The synchronous notifying module 104 is used to notify, in a synchronous manner, other physical CPUs corresponding to other virtual CPUs when it is determined that the current virtual CPU scheduled by the current physical CPU is required to be synchronized with the operation of the other virtual CPUs.

The synchronous notifying module 104 comprises a state deciding unit 1041, a first synchronous notifying unit 1042 and a second synchronous notifying unit 1043.

The state deciding unit 1041 is used to decide whether the VCPU scheduled by the current physical CPU is the VCPU of the synchronous GOS or not. If so, the first synchronous notifying unit or the second synchronous notifying unit is initiated; otherwise, take no actions, and other physical CPUs will schedule the VCPU in their scheduling queues as the original order.

The first synchronous notifying unit 1042 is used to transmit a synchronization request to other physical CPUs, so that other physical CPUs can find out the VCPU of the synchronous GOS from their respective scheduling queues based on the synchronization request.

The second synchronous notifying unit 1043 is used to transmit a synchronization request to the current physical CPU, so that the current physical CPU can transmit Inter-Processor Interrupt (IPI) information to other physical CPUs based on the synchronization request. Other physical CPUs can thus search the VCPU of the synchronous GOS in their respective scheduling queues according to the IPI information.

The synchronous scheduling module 105 is used to schedule the searched VCPU of the synchronous GOS out of the scheduling queues by applying preemptive scheduling policy and to operate it on the corresponding physical CPU, which corresponds to the scheduling queues in which the VCPU of the synchronous GOS is located.

Figure 2:
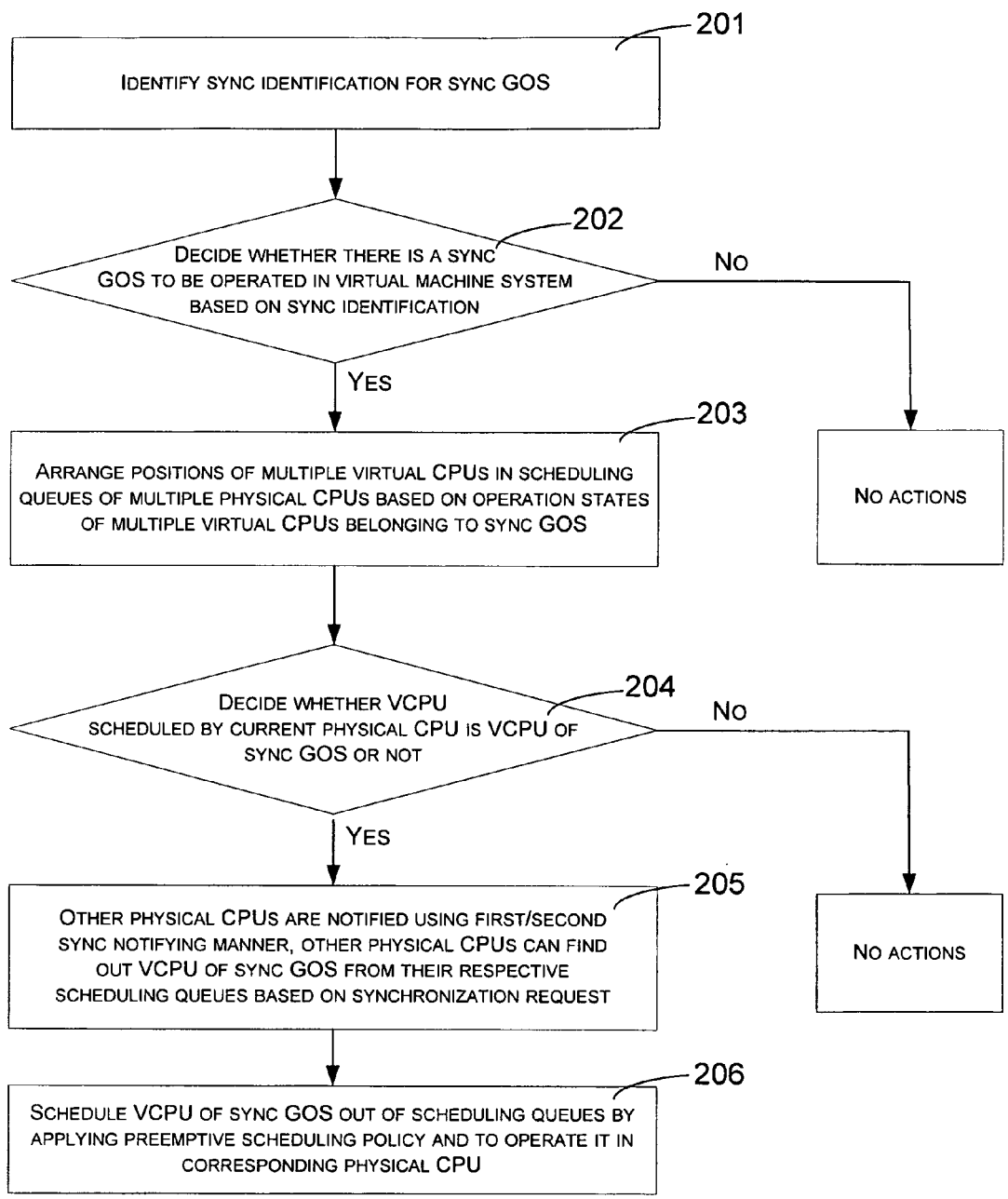
FIG. 2 is a flow chart of the method for synchronous scheduling of multiple VCPUs according to the first embodiment of the present invention.

FIG. 2 is a flow chart of the method for synchronous scheduling of multiple VCPUs according to the first embodiment of the present invention, the method comprising the following detailed steps.

In step 201, the VMM identifies a synchronous identification for the synchronous GOS.

In this step, the synchronous GOS is the GOS comprising multiple VCPUs whose operation needs synchronous scheduling.

In step 202, the VMM decides whether there is a synchronous GOS to be operated in the virtual machine system based on the synchronous identification. If so, the process proceeds to step 203; otherwise, take no actions.

In step 203, the VMM arranges the positions of the multiple virtual CPUs in the scheduling queues of the multiple physical CPUs based on the operation states of the multiple virtual CPUs belonging to the synchronous GOS.

Next, the step 203 will be detailed with a virtual machine system comprising a VMM, a GOS and a dual core physical CPU as an example.

In such a virtual machine system, the GOS comprises a first VCPU and a second VCPU, and the dual core physical CPU comprises a first physical CPU and a second physical CPU. The first VCPU located in the scheduling queue of the first physical CPU, waiting to be operated by the first physical CPU. The second VCPU located in the scheduling queue of the second physical CPU, waiting to be operated by the second physical CPU. When the VMM schedules the first VCPU located in the scheduling queue of the first physical CPU into the scheduling queue of the second physical CPU, it also schedules the second VCPU located in the scheduling queue of the second physical CPU into the scheduling queue of the first physical CPU in order to guarantee the synchronous scheduling of the first VCPU and the second VCPU. Thereby, it can be guaranteed that the two VCPU of the GOS operates synchronously on different physical CPUs, respectively. For a virtual machine system comprising more than two GOSs and multiple core physical CPU, the synchronous scheduling of multiple VCPUs belonging to a synchronous GOS can be achieved in a similar way.

This step is used for guaranteeing that multiple VCPUs of a synchronous GOS can always be arranged in the scheduling queues of multiple physical CPUs.

In step 204, the VMM decides whether the VCPU scheduled by the current physical CPU is the VCPU of the synchronous GOS or not. If so, the process proceeds to step 205; otherwise, take no actions, and other physical CPUs will schedule the VCPU in their scheduling queues as the original order.

In step 205, other physical CPUs are notified using a first synchronous notifying manner or a second synchronous notifying manner. The other physical CPUs can find out the VCPU of the synchronous GOS from their respective scheduling queues based on the synchronization request.

In this step, in case of the first synchronous notifying manner, the VMM transmits a synchronization request to other physical CPUs, so that other physical CPUs can search the VCPU of the synchronous GOS from their respective scheduling queues based on the synchronization request.

In case of the second synchronous notifying manner, the VMM transmits a synchronization request to the physical CPU, so that the physical CPU can transmit IPI information to other physical CPUs based on the synchronization request. Other physical CPUs can thus search the VCPU of the synchronous GOS in their respective scheduling queues according to the IPI information.

In step 206, the VMM schedules the searched VCPU of the synchronous GOS out of the scheduling queues by applying preemptive scheduling policy and to operate it in the corresponding physical CPU, which corresponds to the scheduling queues in which the VCPU of the synchronous GOS is located.

Figure 3:
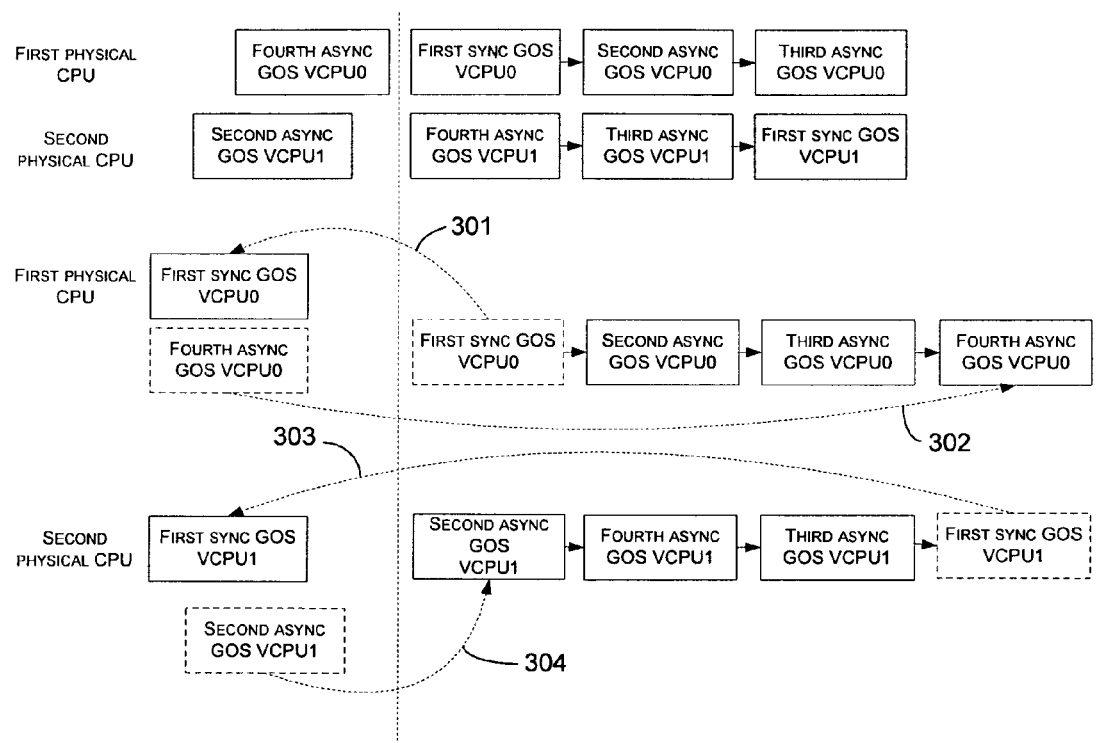
FIG. 3 is an illustrative diagram of the process of synchronous scheduling of multiple VCPUs according to the embodiments of the present invention.

FIG. 3 is an illustrative diagram of the process of synchronous scheduling of multiple VCPUs according to the embodiments of the present invention. In FIG. 3, there are a first physical CPU and a second physical CPU, in which:

the scheduling queue of the first physical CPU comprises a VCPU0 of a fourth asynchronous GOS, a VCPU0 of a first synchronous GOS, a VCPU0 of a second asynchronous GOS and a VCPU0 of a third asynchronous GOS; and the scheduling queue of the second physical CPU comprises a VCPU1 of a second asynchronous GOS, a VCPU1 of a fourth asynchronous GOS, a VCPU1 of a third asynchronous GOS and a VCPU1 of a first synchronous GOS.

In steps 301 and 302, after the first physical CPU accomplishing the scheduled operation of the VCPU0 of the fourth asynchronous GOS, the VMM schedules the VCPU0 of the first synchronous GOS in the schedule queue onto the first physical CPU to operate thereon by applying a preemptive scheduling policy, and schedules the VCPU0 of the fourth asynchronous GOS out of the first physical CPU.

In steps 303 and 304, after receiving the synchronization request, the second physical CPU searches the VCPU1 of the first synchronous GOS, then the VMM schedules the VCPU1 of the first synchronous GOS in the schedule queue onto the second physical CPU to operate thereon by applying a preemptive scheduling policy, and schedules the VCPU1 of the second asynchronous GOS out of the second physical CPU.

Figure 4:
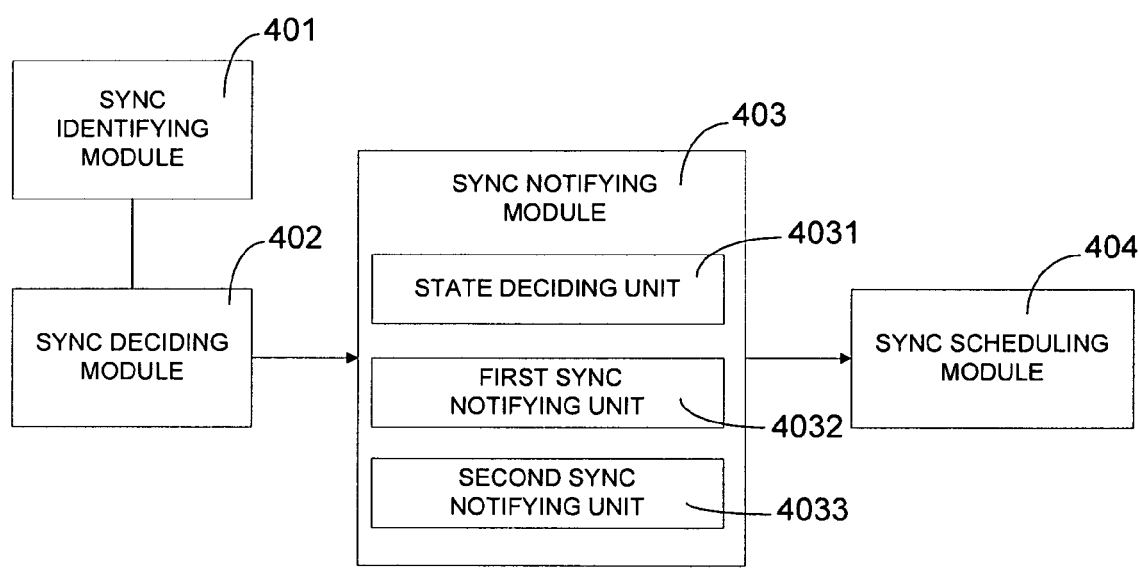
FIG. 4 is a block diagram of the structure of the means for synchronous scheduling of multiple VCPUs according to the second embodiment of the present invention.

FIG. 4 is a block diagram of the structure of the means for synchronous scheduling of multiple VCPUs according to the second embodiment of the present invention. In FIG. 4, there are a synchronous identifying module 401, a synchronous deciding module 402, a synchronous notifying module 403 and a synchronous scheduling module 404.

The synchronous identifying module 401 is used to identify a synchronous identification for the synchronous GOS, wherein the synchronous GOS is the GOS comprising multiple VCPUs whose operation needs synchronous scheduling.

The synchronous deciding module 402 is used to decide whether there is a synchronous GOS to be operated in the virtual machine system based on the synchronous identification.

The synchronous notifying module 403 is used to notify, in a synchronous manner, other physical CPUs corresponding to other virtual CPUs when it is determined that the current virtual CPU scheduled by the current physical CPU is required to be synchronized with the operation of the other virtual CPUs.

The synchronous notifying module 403 comprises a state deciding unit 4031, a first synchronous notifying unit 4032 and a second synchronous notifying unit 4033.

The state deciding unit 4031 is used to decide whether the VCPU scheduled by the current physical CPU is the VCPU of the synchronous GOS or not. If so, the first synchronous notifying unit or the second synchronous notifying unit is initiated; otherwise, take no actions, and other physical CPUs will schedule the VCPU in their scheduling queues as the original order.

The first synchronous notifying unit 4032 is used to transmit a synchronization request to other physical CPUs, so that other physical CPUs can search the VCPU of the synchronous GOS from their respective scheduling queues based on the synchronization request.

The second synchronous notifying unit 4033 is used to transmit a synchronization request to the physical CPU, so that the physical CPU can transmit IPI information to other physical CPUs based on the synchronization request. Other physical CPUs can thus search the VCPU of the synchronous GOS in their respective scheduling queues according to the IPI information.

The synchronous scheduling module 404 is used to schedule the searched VCPU of the synchronous GOS out of the scheduling queues by applying preemptive scheduling policy and to operate it on the corresponding physical CPU, which corresponds to the scheduling queues in which the VCPU of the synchronous GOS is located.

FIG. 5 is a flow chart of the method for synchronous scheduling of multiple VCPUs according to the second embodiment of the present invention.

In step 501, the VMM identifies a synchronous identification for the synchronous GOS.

In this step, the synchronous GOS is the GOS comprising multiple VCPUs whose operation needs synchronous scheduling.

In step 502, the VMM decides whether there is a synchronous GOS to be operated in the virtual machine system based on the synchronous identification. If so, the process proceeds to step 503; otherwise, take no actions.

In step 503, the VMM decides whether the VCPU scheduled by the current physical CPU is the VCPU of the synchronous GOS or not. If so, the process proceeds to step 504; otherwise, take no actions, and other physical CPUs will schedule the VCPU in their scheduling queues as the original order.

In step 504, other physical CPUs are notified using a first synchronous notifying manner or a second synchronous notifying manner. The other physical CPUs can find out the VCPU of the synchronous GOS from their respective scheduling queues based on the synchronization request.

In this step, in case of the first synchronous notifying manner, the VMM transmits a synchronization request to other physical CPUs, so that other physical CPUs can search the VCPU of the synchronous GOS from their respective scheduling queues based on the synchronization request.

In case of the second synchronous notifying manner, the VMM transmits a synchronization request to the physical CPU, so that the physical CPU can transmit IPI information to other physical CPUs based on the synchronization request. Other physical CPUs can thus search the VCPU of the synchronous GOS in their respective scheduling queues according to the IPI information.

In step 505, the VMM schedules the searched VCPU of the synchronous GOS out of the scheduling queues by applying preemptive scheduling policy and to operate it in the corresponding physical CPU, which corresponds to the scheduling queues in which the VCPU of the synchronous GOS is located.

For virtual systems based on the SEDF scheduling algorithm, the method according to the second embodiment of the present invention can be employed to achieve the synchronous scheduling of the operation of multiple VCPU belonging to the synchronous GOS.

It should be noted that the foregoing embodiments are only preferred embodiments and should not be considered as limiting the present invention. It will be understood by those skilled in the art that various changes, equivalent alternatives and improvements may be made without departing from the spirit and scope of the present invention defined by the appended claims.

What is claimed is:

1. A method for synchronous scheduling of multiple virtual CPUs, comprising:
    determining a second virtual CPU to be synchronously operated with a first virtual CPU scheduled into a first physical CPU;
    notifying, in a synchronous manner, a second physical CPU of the determination, wherein the second physical CPU corresponds to the second virtual CPU and has a scheduling queue in which the second virtual CPU is contained;
    searching the scheduling queue for the second virtual CPU by the second physical CPU; and
    scheduling the second virtual CPU out of the scheduling queue, and operating the second virtual CPU on the second physical CPU.

2. The method according to claim 1, wherein the step of notifying comprises:
    transmitting a synchronization request to the second physical CPU; or
    transmitting a synchronization request to the first physical CPU, the synchronization request being forwarded to the second physical CPU by the first physical CPU in a predetermined way.

3. The method according to claim 2, wherein the predetermined way is inter-processor interrupt manner.

4. The method according to claim 1, wherein the first virtual CPU and the second virtual CPU both belong to the same guest operation system, which is a synchronous guest operation system.

5. The method according to claim 4, wherein the step of determining comprises:
    identifying a synchronous identification for the synchronous guest operation system; and
    determining the guest operation system which is operating as the synchronous guest operation system based on the synchronous identification.

6. The method according to claim 4, further comprising:
    arranging the positions of the multiple virtual CPUs in the scheduling queues of the corresponding multiple physical CPUs based on the operation states of the multiple virtual CPUs belonging to the synchronous guest operation system.

7. A computer, comprising:
 a guest operation system, comprising a first virtual CPU and a second virtual CPU;
 a first physical CPU and a second physical CPU, the first physical CPU having a first scheduling queue and the second physical CPU having a second scheduling queue, wherein the first virtual CPU corresponds to the first scheduling queue and the second virtual CPU corresponds to the second scheduling queue; and
 a virtual machine monitor, comprising:
  synchronous notifying module, configured to, after the second virtual CPU is determined to be synchronously operated with the first virtual CPU scheduled into the first physical CPU, notify in a synchronous manner the second physical CPU of the determination; and
  synchronous scheduling module, configured to schedule the second virtual CPU out of the scheduling queue;
 wherein the second virtual CPU is operated on the second physical CPU.

8. The computer according to claim 7, wherein the synchronous notifying module comprises:
 a first synchronous notifying unit, configured to transmit synchronization request to the second physical CPU; and
 a second synchronous notifying unit, configured to transmit a synchronization request to the first physical CPU, the synchronization request being forwarded to the second physical CPU by the first physical CPU in a predetermined way.

9. The computer according to claim 8, wherein the predetermined way is inter-processor interrupt manner.

10. The computer according to claim 7, wherein the first virtual CPU and the second virtual CPU both belong to the same guest operation system, which is a synchronous guest operation system.

11. The computer according to claim 7, further comprising:
 a synchronous identifying module, configured to identify a synchronous identification for the synchronous guest operation system; and
 a synchronous deciding module, configured to decide the guest operation system which is operating as the synchronous guest operation system based on the synchronous identification.

12. The computer according to claim 7, further comprising:
 an environment adjusting module, configured to arrange the positions of the multiple virtual CPUs in the scheduling queues of the corresponding multiple physical CPUs based on the operation states of the multiple virtual CPUs belonging to the synchronous guest operation system.

13. A method for synchronous scheduling of multiple virtual CPUs, comprising:
 determining a second virtual CPU to be synchronously operated with a first virtual CPU scheduled into a first physical CPU;
 notifying, in a synchronous manner, a second physical CPU of the determination, wherein the second physical CPU corresponds to the second virtual CPU and has a scheduling queue in which the second virtual CPU is contained;
 identifying, by the second physical CPU, the second virtual CPU from the scheduling queue; and
 scheduling the second virtual CPU out of the scheduling queue, and operating the second virtual CPU on the second physical CPU.

* * * * *